United States Patent Office 2,726,365
Patented Dec. 6, 1955

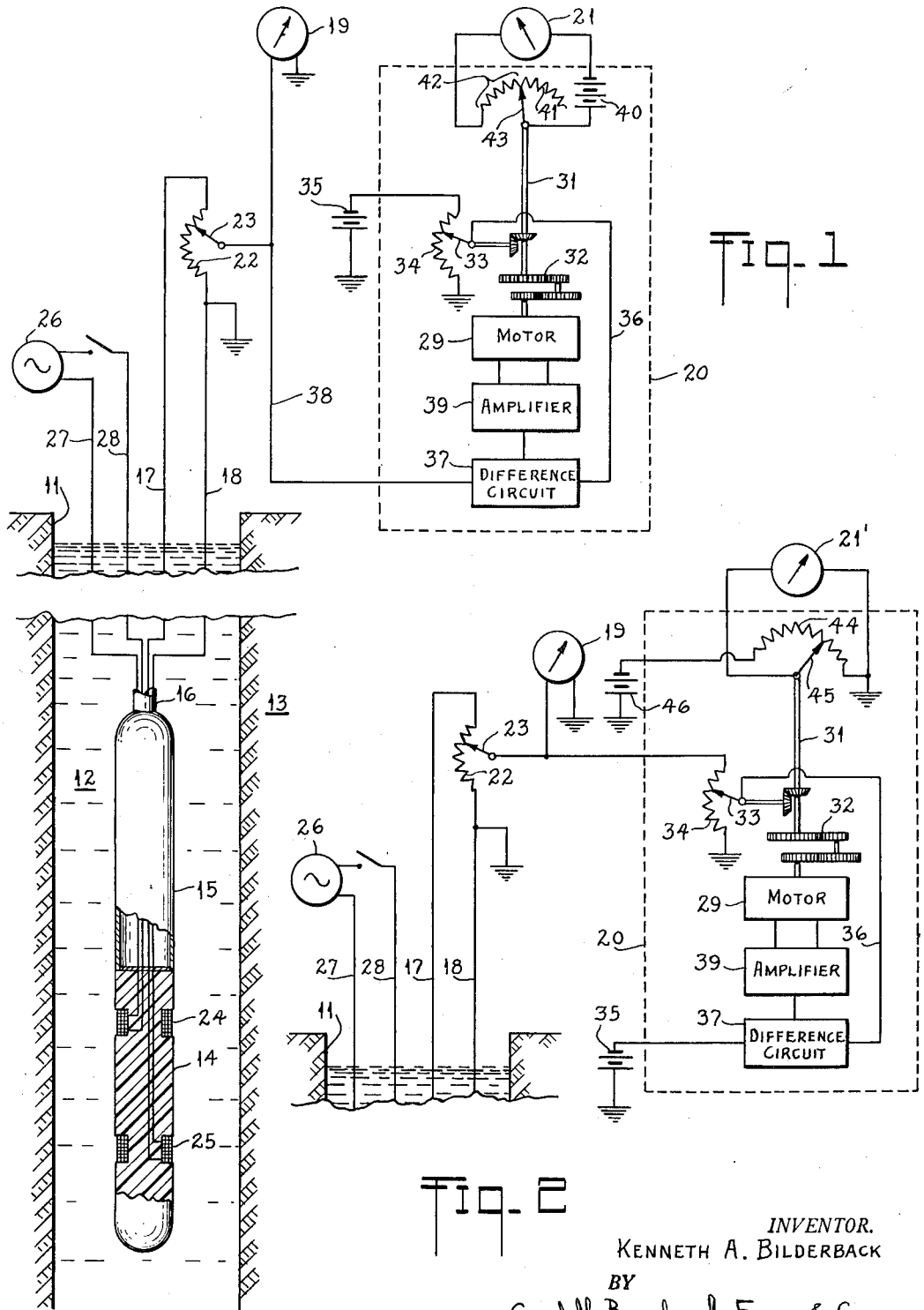

2,726,365

ELECTROMECHANICAL COMPUTERS

Kenneth A. Bilderback, Abilene, Tex., assignor to Schlumberger Well Surveying Corporation, Houston, Tex., a corporation of Delaware Application June 12, 1952, Serial No. 293,146

12 Claims. (Cl. 324—1)

The present invention relates to electromechanical computers and, more particularly, to a computer for multiplying and/or dividing quantities represented by the amplitudes of electrical signals.

It is a primary object of the invention to provide an electromechanical computer for deriving an electrical signal proportional to the product or quotient of two variable signals or the reciprocal of one variable signal.

In the electrical logging of boreholes, it is conventional to obtain indications of the resistivity of formations as a function of the depth of the measuring apparatus in the borehole. However, it is now often convenient to employ induction logging methods, which may be used in wells containing either conductive drilling liquid or oil base muds. Induction logging apparatus generates a signal, the amplitude of which varies as a direct function of the conductivity of the formations. The log thus obtained is difficult to compare with resistivity logs previously obtained in the same or adjacent boreholes.

Accordingly, a more specific object of the present invention is to provide a computer for converting a signal representing a characteristic of earth formations traversed by a borehole into a signal representing the reciprocal of the characteristic.

A further object is to provide an accurate, compact and rugged computer that permits the recording of resistivity curves from apparatus yielding conductivity signals.

In accordance with the invention a first electrical signal is applied to a transducer which is adapted to reduce the first signal by a controllable factor, and the reduced signal is balanced against a second electrical signal. The amplitude difference between the reduced first signal and the second signal is applied as an error signal to a servo-system which automatically controls the transducer and thus the reduction factor so as to maintain the second signal and the reduced first signal substantially equal. The reduction factor of the transducer is, therefore, continuously equal to the ratio of the second signal to the first signal. This reduction factor may be mechanically or electrically reproduced either to obtain an indication of the desired ratio or to use the ratio in subsequent computations. The transducer may take the form of, for example, a variable autotransformer or a resistive voltage divider having a movable output contact the position of which is indicative of the desired ratio.

A variable impedance may be controlled in synchronism with the transducer and have a third electrical signal impressed thereacross. In accordance with Ohm's law, the current through the variable impedance will vary in direct proportion to the third electrical signal and in inverse proportion to the desired ratio. If the first and third signals have substantially constant amplitudes, the current through the impedance will be proportional to the reciprocal of the second signal amplitude.

Alternatively, a further transducer may be mechanically coupled to the first transducer. A third electrical signal impressed across the further transducer yields an output signal having an amplitude proportional to the product of the third signal and the desired ratio. If the amplitudes of the second and third signals are substantially constant, the output signal will represent the reciprocal of the first signal amplitude.

The invention is illustrated and described with particular reference to a reciprocal computer for electrical well logging wherein a signal representing a characteristic, such as conductivity, of earth formations traversed by a borehole is transformed into a signal representing the reciprocal of the characteristic.

In order that the invention may be more fully understood, it will now be described in detail, reference being made to the accompanying drawings in which:

Fig. 1 is a schematic diagram of a computing apparatus adapted to indicate the reciprocal of a characteristic of the earth formations traversed by a borehole, and Fig. 2 is a schematic diagram of a modified form of the apparatus shown in Fig. 1.

Referring now to Fig. 1, a borehole 11 is shown containing drilling liquid 12 and traversing earth formations 13, a characteristic of which it is desired to investigate. A logging array 14 associated with a pressure-resistant housing 15 is arranged to be passed through the borehole 11 by means of a conventional electrical cable 16 and a winch (not shown). The array 14, together with the apparatus within the housing 15, is adapted to generate an electrical signal which is representative of a characteristic of the earth formations. The representative signal is transmitted over insulated cable conductors 17 and 18 to an indicator 19 and to a reciprocal computer 20 and a reciprocal indicator 21 exterior to the borehole.

The representative signal may first be applied across a voltage divider 22 which has an adjustable contact arm 23 which permits adjustment of the scale factor of the signal. The potential appearing at the contact arm 23 is supplied to the computer 20 which derives the reciprocal of the applied signal and indicates the same on the indicator 21, which may be a recording galvanometer. The contact arm 23 may also be connected to the indicator 19, which may be a second recording galvanometer, to indicate the representative signal itself. The indicators 19 and 21 may conveniently record on the same chart as a function of the depth of the logging array 14 in the borehole 11.

The logging array 14 may comprise a transmitting coil system 24 excited by an oscillator of an induction logging apparatus (not shown) contained within the housing 15 and a receiving coil system 25 adapted to respond to variations caused by the surrounding formations in the magnetic field established by the transmitting coil system 24. The induction logging apparatus may be energized from outside the borehole by an alternating current source 26 which is connected to the housing 15 by insulated cable conductors 27 and 28.

The coil systems 24 and 25 may, for example, be constructed in accordance with the principles set forth in Patent No. 2,582,314, entitled "Electromagnetic Well Logging System," which issued to Henri-Georges Doll on January 15, 1952. The induction logging apparatus may take the form of the apparatus disclosed in copending application Serial No. 750,307, entitled "Phase Rejection Networks," and filed May 12, 1947, in the name of Henri-Georges Doll. The representative signal generated by such apparatus and appearing between the conductors 17 and 18 is a unidirectional signal proportional to the conductivity of the formations 13 surrounding the housing 15. It is often desirable to convert this conductivity signal to a resistivity indication, which latter bears a reciprocal relation to the former, in order to facilitate comparison of the induction log with resistivity logs.

The reciprocal computer 20 comprises a servomotor 29 which is adapted to drive a shaft 31 through reduction gearing 32. A movable contact arm 33 of a voltage divider 34 is coupled to the shaft 31. A source 35 of substantially constant voltage is connected across the voltage divider 34. The voltage divider 34 may take the form of a conventional linearly wound rotary resistive potentiometer wherein the resistance between the arm 33 and a fixed terminal thereof is directly proportional to the angular position of the shaft 31. The fraction $b$ of the constant voltage from the source 35 that appears at the contact arm 33 is equal to the ratio of the resistance between the arm 33 and ground to the total resistance of the voltage divider to ground. This reduced voltage is supplied over a conductor 36 to a difference circuit 37 to which is also supplied the representative signal from the scale adjusting voltage divider 22 by means of a conductor 38. The difference circuit 37 supplies the difference between these two signals as an error signal to a servoamplifier 39 which controls the speed and direction of rotation of the motor 29 in accordance with the amplitude and polarity, respectively, of the error signal. It is often convenient or desirable to operate the servomotor 29 on alternating current. Under these conditions the difference circuit 37 may include a direct to alternating current converter such as a modulator or chopper. The servomotor 29, accordingly, drives the shaft 31 and the contact arm 33 of the voltage divider 34 until the difference signal is zero whereupon the fraction $b$ is equal to the ratio between the amplitude of the representative signal and the constant voltage applied across the voltage divider 34. The angular position of the shaft 31 is likewise proportional to this ratio and thus proportional to the amplitude of the representative signal.

A rheostat 41 having a rotatable contact arm 43 is connected to the shaft 31. A source 40 of substantially constant voltage is connected in series with the indicator 21 across the rheostat 41. The portion 42 of the rheostat 41 that remains in the series circuit is consequently directly proportional to the angular position of the shaft 31 and thus proportional to the amplitude of the representative signal. The current indicated by the indicator 21 in accordance with Ohm's law is continuously proportional to the reciprocal of the resistance corresponding to the portion 42 of the rheostat 41, and therefore is proportional to the reciprocal of the representative signal. In the particular embodiment of Fig. 1, the indicator 21 may be read in terms of the resistivity of the formations being investigated. It is to be observed that the current applied to the indicator 21 is also proportional to the product of the voltages from the sources 35 and 40, which in a different form of the invention may be variable.

In Fig. 2 the representative signal is applied to the voltage divider 34 and the source 35 of substantially constant voltage is connected to one input of the difference circuit 37. Under these conditions a fraction $b$ of the representative signal is continuously made equal to the constant voltage through the action of the servomotor 29. Accordingly, the fraction $b$ is proportional to the reciprocal of the representative voltage and this value may be indicated by an indicator 21' coupled to the shaft 31. The coupling may be a direct mechanical connection between the shaft 31 and the pointer of the indicator 21'. However, for convenience, it is preferable to convert the mechanical position of the shaft 31 into a proportional electrical amplitude. This may be accomplished by the provision of a voltage divider 44 across which a voltage is impressed from a source 46. A movable contact 45 on the voltage divider 44 is mechanically connected to the shaft 31 and electrically connected through the indicator 21' to ground. Accordingly, the indicator 21' will indicate an amplitude proportional to the reciprocal of the representative voltage. It is to be noted that the potential applied to the indicator 21' is also proportional to the product of the voltages from the sources 35 and 46, which in another form of the invention may be variable.

Various changes are contemplated in the illustrated embodiments according to the type of variable quantities with which the computer is to be employed. For example, all the signals both of constant and variable amplitude may be alternating voltages having the same frequency and equal or opposite phase. Accordingly, the invention is to be limited only by the language of the appended claims.

I claim:

1. An electromechanical computer comprising a transducer for supplying an output signal that is an adjustable fraction of an input signal, a first voltage source for supplying an input signal to said transducer, a motor adapted to adjust said transducer, a second voltage source, means for controlling said motor in accordance with the difference between the output signal from said transducer and the voltage from said second source to maintain said output signal substantially equal to the voltage from said second source, a variable impedance, a third source of voltage connected across said impedance, a current indicator in series with said third source and said impedance, and means for controlling said impedance in synchronism with the control of said transducer whereby the indication of said indicator is proportional to the product of the voltages from said first and third sources divided by the voltage from said second source.

2. An electromechanical computer comprising a first source of potential representative of a variable quantity, a second source of potential, means for reducing the potential from one of said first and second sources by a controllable ratio to produce a reduced potential, means for controlling said potential reducing means in accordance with the difference between said reduced potential and the potential from the other of said first and second sources to maintain the reduced potential substantially equal to said potential from said other of said sources, a variable impedance, a third source of potential connected across said impedance, a current indicator in series with said third source and said impedance, and means for controlling said impedance in synchronism with the control of said potential reducing means whereby the indication of said indicator is a measure of the reciprocal of the quantity represented by said first potential.

3. In electrical well logging apparatus, means for obtaining a representative signal having an amplitude indicative of a characteristic of earth formations traversed by a borehole, a source of a substantially constant amplitude signal, means for reducing one of said representative and constant amplitude signals by a controllable ratio to produce a reduced signal, means for controlling said signal reducing means in accordance with the difference between said reduced signal and the other of said representative and constant amplitude signals to maintain the reduced signal substantially equal to said other of said signals, and an indicator responsive to said controllable ratio for indicating the reciprocal of said characteristic of the formations.

4. In electrical well logging apparatus, means for obtaining a representative signal having an amplitude indicative of a characteristic of earth formations traversed by a borehole, a source of a substantially constant amplitude signal, means for reducing said constant amplitude signal by a controllable ratio to produce a reduced signal, means for controlling said signal reducing means in accordance with the difference between said reduced signal and said representative signal to maintain said reduced signal substantially equal to said representative signal, a variable impedance, a source of constant voltage connected across said impedance, a current indicator in series with said source and said impedance, and means for controlling said impedance in synchronism with the control of said signal reducing means whereby the indication of said indicator is a measure of the reciprocal of said characteristic of the formations.

5. In electrical well logging apparatus, means for obtaining a representative signal having an amplitude indicative of a characteristic of earth formations traversed by a borehole, means for reducing said representative signal by a controllable ratio to produce a reduced signal, means for controlling said signal reducing means in accordance with the difference between said reduced signal and a signal of constant amplitude to maintain the reduced signal substantially equal to said constant amplitude signal, and means for indicating the reciprocal of said characteristic of the formations in terms of said controllable ratio.

6. In electrical well logging apparatus, means adapted to pass through a borehole for generating a representative signal having an amplitude indicative of a characteristic of the earth formations traversed by the borehole, a transducer for supplying an output signal that is an adjustable fraction of an input signal, a source of a substantially constant amplitude signal, means for applying one of said representative and constant amplitude signals to said transducer, a motor adapted to adjust said transducer, means for controlling said motor in accordance with the difference between said output signal of said transducer and the other of said representative and constant amplitude signals to maintain said output signal substantially equal to said other of said signals, and an indicator responsive to the adjustment of said transducer for indicating the reciprocal of said characteristic of the formations.

7. In electrical well logging apparatus, means adapted to pass through a borehole for generating a representative signal having an amplitude indicative of a characteristic of the earth formations traversed by the borehole, a transducer for supplying an output signal that is an adjustable fraction of an input signal, means for applying a constant input signal to said transducer, a motor adapted to adjust said transducer, means for controlling said motor in accordance with the difference between said representative signal and said output signal from said transducer to maintain said signals substantially equal, a variable impedance, means for applying a substantially constant voltage across said impedance, and means for varying the magnitude of said impedance in synchronism with the adjustment of said transducer, and an indicator responsive to the current flowing through said impedance for indicating the reciprocal of said characteristic of the formations.

8. In electrical well logging apparatus, means adapted to pass through a borehole for generating a representative signal having an amplitude indicative of the conductivity of the earth formations traversed by the borehole, a voltage divider having a variable amplitude output signal, means for applying a constant voltage to said divider, a servomotor adapted to vary the amplitude of the output signal of said voltage divider, means for controlling said motor in accordance with the difference between said representative signal and said output signal of said voltage divider to maintain said signals substantially equal, a variable impedance, means for applying a constant voltage across said impedance, and means for varying the magnitude of said impedance in synchronism with the variation of said output signal of said voltage divider, and an indicator responsive to the current flowing through said impedance for indicating the resistivity of the formations.

9. In electrical well logging apparatus, means adapted to pass through a borehole for generating a representative signal having an amplitude indicative of the conductivity of the earth formations traversed by the borehole, a resistive voltage divider having a sliding contact, means for applying a constant voltage to said divider, a servomotor adapted to move the sliding contact on said voltage divider, means for controlling said motor in accordance with the difference between said representative signal and the signal obtained from the sliding contact of said voltage divider to maintain said signals substantially equal, a rheostat having a sliding contact, means for applying a constant voltage to said rheostat, means for actuating the sliding contact of said rheostat in synchronism with the sliding contact of said voltage divider, and an indicator responsive to the current flowing through said rheostat for indicating the resistivity of said formations.

10. In electrical well logging apparatus, means for obtaining a representative signal indicative of a characteristic of earth formations traversed by a borehole, a transducer for supplying an output signal that is an adjustable fraction of an input signal, means for applying said representative signal as the input signal of said transducer, a motor adapted to adjust said transducer, means for controlling said motor in accordance with the difference between said output signal of said transducer and a signal of constant amplitude to maintain said signals substantially equal, and means for indicating the reciprocal of said characteristic of the formations in terms of the adjustment of said transducer.

11. In electrical well logging apparatus, means for obtaining a representative signal indicative of the conductivity of earth formations traversed by a borehole, a voltage divider having a variable amplitude output signal, means for applying said representative signal across said voltage divider, a servomotor adapted to vary the amplitude of the output signal of said voltage divider, means for controlling said motor in accordance with the difference between said output signal and a signal of constant amplitude to maintain said signals substantially equal, and means for indicating the resistivity of said formations in terms of the variation of said voltage divider.

12. In electrical well logging apparatus, means for obtaining a representative signal indicative of the conductivity of earth formations traversed by a borehole, a resistive voltage divider having a sliding contact, means for applying said representative signal across said voltage divider, a servomotor adapted to move the sliding contact on said voltage divider, means for controlling said motor in accordance with the difference between the voltage on said sliding contact and a constant voltage to maintain said voltages substantially equal, and means for indicating the resistivity of said formations in terms of the position of said sliding contact.

References Cited in the file of this patent

UNITED STATES PATENTS

| | | |
|---|---|---|
| 2,220,070 | Aiken | Nov. 5, 1940 |
| 2,220,788 | Lohman | Nov. 5, 1940 |
| 2,264,318 | Lee | Dec. 2, 1941 |
| 2,304,051 | Beers | Dec. 1, 1942 |
| 2,439,891 | Hornfeck | Apr. 20, 1948 |
| 2,624,505 | Wing | Jan. 6, 1953 |

OTHER REFERENCES

Electrical Analogue Computing by D. J. Mynall, Electronic Engineering, July 1947, pages 214–217.